United States Patent
Kumar et al.

(10) Patent No.: US 12,014,728 B2
(45) Date of Patent: Jun. 18, 2024

(54) DYNAMIC COMBINATION OF ACOUSTIC MODEL STATES

(71) Applicant: Microsoft Technology Licensing, LLC, Redmond, WA (US)

(72) Inventors: Kshitiz Kumar, Redmond, WA (US); Yifan Gong, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 974 days.

(21) Appl. No.: 16/363,705

(22) Filed: Mar. 25, 2019

(65) Prior Publication Data

US 2020/0312307 A1 Oct. 1, 2020

(51) Int. Cl.
| | |
|---|---|
| *G10L 15/00* | (2013.01) |
| *G06N 3/045* | (2023.01) |
| *G06N 3/08* | (2023.01) |
| *G06N 20/20* | (2019.01) |
| *G10L 15/16* | (2006.01) |
| *G10L 15/02* | (2006.01) |
| *G10L 15/22* | (2006.01) |
| *G10L 25/30* | (2013.01) |

(52) U.S. Cl.
CPC .............. *G10L 15/16* (2013.01); *G06N 3/045* (2023.01); *G06N 3/08* (2013.01); *G06N 20/20* (2019.01); *G10L 15/02* (2013.01); *G10L 15/22* (2013.01); *G10L 25/30* (2013.01)

(58) Field of Classification Search
CPC ......... G10L 15/07; G10L 15/20; G10L 15/22; G10L 15/30; G10L 15/02; G10L 15/063; G10L 15/12; G10L 15/16; G10L 25/30; G10L 19/00; G10L 25/27; G10L 25/78; G10L 25/87; G10L 21/0208; G10L 19/005

See application file for complete search history.

(56) References Cited

U.S. PATENT DOCUMENTS

| | | | | |
|---|---|---|---|---|
| 8,935,167 | B2 * | 1/2015 | Bellegarda | ............ G10L 15/063 704/231 |
| 9,240,184 | B1 * | 1/2016 | Lin | ........................ G10L 15/142 |
| 2010/0057453 | A1 * | 3/2010 | Valsan | .................... G10L 25/78 704/232 |
| 2018/0174576 | A1 * | 6/2018 | Soltau | .................... G06N 3/084 |

(Continued)

OTHER PUBLICATIONS

Abdelaziz, et al., "Dynamic Stream Weight Estimation in Coupled-HMM-based Audio-visual Speech Recognition Using Multilayer Perceptrons", In Proceedings of the Fifteenth Annual Conference of the International Speech Communication Association, Sep. 14, 2014, pp. 1144-1148.

(Continued)

*Primary Examiner* — Vu B Hang

(74) *Attorney, Agent, or Firm* — Schwegman Lundberg & Woessner, P.A.

(57) ABSTRACT

A computer implemented method classifies an input corresponding to multiple different kinds of input. The method includes obtaining a set of features from the input, providing the set of features to multiple different models to generate state predictions, generating a set of state-dependent predicted weights, and combining the state predictions from the multiple models, based on the state-dependent predicted weights for classification of the set of features.

11 Claims, 4 Drawing Sheets

(56) References Cited

U.S. PATENT DOCUMENTS

2019/0026252 A1* 1/2019 Allmaras .............. G05B 17/02

OTHER PUBLICATIONS

Geiger, et al., "Robust Speech Recognition using Long Short-Term Memory Recurrent Neural Networks for Hybrid Acoustic Modelling", In Proceedings of the Fifteenth Annual Conference of the International Speech Communication Association, Sep. 14, 2014, pp. 631-635.
Glotin, et al., "Weighting Schemes for Audio-Visual Fusion in Speech Recognition", In Proceedings of the IEEE International Conference on Acoustics, Speech, and Signal Processing, May 7, 2001, pp. 173-176.
Lee, et al., "Multi-Stream Combination for LVCSR and Keyword Search on GPU-Accelerated Platforms", In Proceedings of the IEEE International Conference on Acoustics, Speech and Signal Processing, May 4, 2014, pp. 3296-3300.
"International Search Report and Written Opinion Issued in PCT Application No. PCT/US2020/015760", dated May 28, 2020, 12 Pages.
Tamura, et al., "A Stream-Weight Optimization Method for Multi-Stream HMMs Based on Likelihood Value Normalization", In Proceedings of the IEEE International Conference on Acoustics, Speech, and Signal Processing, Mar. 23, 2005, pp. 469-472.
Bahdanau, et al., "End-to-end Attention-based Large Vocabulary Speech Recognition", arXiv:1508.04395v2 [cs.CL] Mar. 14, 2016. In Journal of the Computing Research Repository, Aug. 2015, 8 Pages.
Barker, et al., "The Fifth 'CHiME' Speech Separation and Recognition Challenge: Dataset, Task and Baselines", arXiv, arXiv: 1803.10609, Mar. 28, 2018, In Journal of the Computing Research Repository, Mar. 2018, 5 Pages.
Chiu, et al., "State-of-the-Art Speech Recognition with Sequence-to-Sequence Models", In Proceedings of IEEE International Conference on Acoustics, Speech and Signal Processing, Apr. 15, 2018, pp. 4774-4778.
Chorowski, et al., "Attention-Based Models for Speech Recognition", In Proceedings of Advances in Neural Information Processing Systems, Dec. 7, 2015, 9 Pages.
Dahl, "Context-dependent Pre-Trained Deep Neural Networks for Large-Vocabulary Speech Recognition", In Proceedings of IEEE Transactions on Audio, Speech, and Language Processing vol. 20, Issue 1, Jan. 2012, pp. 30-42.
Deng, et al., "Recent Advances in Deep Learning for Speech Research at Microsoft", In Proceedings of IEEE International Conference on Acoustics, Speech and Signal Processing, May 26, 2013, pp. 8604-8608.
Evermann, et al., "Posterior Probability Decoding, Confidence Estimation and System Combination", In Proceedings of Speech Transcription Workshop, vol. 27, May 16, 2000, 4 Pages.
Fiscus, Jonathan G., "A Post-Processing System to Yield Reduced Word Error Rates: Recognizer Output Voting Error Reduction (Rover)", In Proceedings of IEEE Workshop on Automatic Speech Recognition and Understanding Proceedings, Dec. 17, 1997, pp. 347-354.
Hinton, et al., "Deep Neural Networks for Acoustic Modeling in Speech Recognition: The Shared Views of Four Research Groups", In Proceedings of IEEE Signal Processing Magazine vol. 29, Issue 6, Nov. 2012, pp. 82-97.
Hochreiter, et al., "Long Short-Term Memory", In Journal of Neural Computation, vol. 9, Issue 8, Nov. 15, 1997, pp. 1735-1780.
Hoffmeister, "Frame Based System Combination and a Comparison with Weighted ROVER and CNC", In Proceedings of Ninth International Conference on Spoken Language Processing, Sep. 17, 2006, pp. 537-540.
Hoffmeister, "iCNC and iROVER: The Limits of Improving System Combination with Classification?", In Proceedings of Ninth Annual Conference of the International Speech Communication Association, Sep. 22, 2008, pp. 232-235.
Kumar, et al., "Intermediate-layer DNN Adaptation for Offline and Session-based Iterative Speaker Adaptation", In Proceedings of Sixteenth Annual Conference of the International Speech Communication Association, Sep. 6, 2015, pp. 1091-1095.
Kumar, et al., "Static and Dynamic State Predictions for Acoustic Model Combination", In Proceedings of IEEE International Conference on Acoustics, Speech and Signal Processing, May 12, 2019, pp. 2782-2786.
Kumar, et al., "Word Characters and Phone Pronunciation Embedding for ASR Confidence Classifier", In Proceedings of IEEE International Conference on Acoustics, Speech and Signal Processing, May 12, 2019, pp. 2712-2716.
Li, et al., "An Overview of Noise-Robust Automatic Speech Recognition", In Proceeding of IEEE/ACM Transactions on Audio, Speech, and Language Processing vol. 22, Issue 4, Apr. 2014, pp. 745-777.
Miao, et al., "Towards Speaker Adaptive Training of Deep Neural Network Acoustic Models", In Proceedings of Fifteenth Annual Conference of the International Speech Communication Association, Sep. 14, 2014, pp. 2189-2193.
Russakovsky, et al., "ImageNet Large Scale Visual Recognition Challenge", Published in International Journal of Computer Vision, vol. 115, Issue 3, Dec. 2015, pp. 211-252.
Sak, et al., "Fast and Accurate Recurrent Neural Network Acoustic Models for Speech Recognition", In Proceedings of 16th Annual Conference of the International Speech Communication Association, Sep. 6, 2015, pp. 1468-1472.
Sak, et al., "Long Short-Term Memory Recurrent Neural Network Architectures for Large Scale Acoustic Modeling", In Proceedings of Fifteenth Annual Conference of the International Speech Communication Association, Sep. 14, 2014, pp. 338-342.
Sak, et al., "Recurrent Neural Aligner: An Encoder-Decoder Neural Network Model for Sequence to Sequence Mapping", In Proceedings of Interspeech, Aug. 20, 2017, pp. 1298-1302.
Seltzer, et al., "An Investigation of Deep Neural Networks for Noise Robust Speech Recognition", In Proceedings of IEEE International Conference on Acoustics, Speech and Signal Processing, May 26, 2013, pp. 7398-7402.
Xiaofei, et al., "Stream Attention for Distributed Multi-Microphone Speech Recognition", In Proceedings of Interspeech, Sep. 2, 2018, pp. 3033-3037.
Wang, et al., "The Microsoft 2017 Conversational Speech Recognition System", arXiv:1708.06073v2 [cs.CL] Aug. 24, 2017, In Journal of Computing Research Repository, Aug. 2017, 9 Pages.
Xue, et al., "Singular Value Decomposition Based Low-Footprint Speaker Adaptation and Personalization for Deep Neural Network", In Proceedings of IEEE International Conference on Acoustics, Speech and Signal Processing, May 4, 2014, pp. 6359-6363.
Yu, et al., "KL-divergence Regularized Deep Neural Network Adaptation for Improved Large Vocabulary Speech Recognition", In Proceedings of International Conference on Acoustics, Speech and Signal Processing, May 26, 2013, pp. 7893-7897.
Zhang, et al., "Maximum Likelihood Sound Source Localization and Beamforming for Directional Microphone Arrays in Distributed Meetings", In Proceedings of IEEE Transactions on Multimedia, vol. 10, Issue 3, Apr. 2008, pp. 538-548.
"Office Action Issued in European Patent Application No. 20708877.4", dated Jul. 6, 2023, 5 Pages.
Communication under Rule 71(3) received in European Application No. 20708877.4, mailed on Mar. 28, 2024, 8 pages.

* cited by examiner

DYNAMIC COMBINATION OF ACOUSTIC MODEL STATES

BACKGROUND

Deep learning has been instrumental in bringing speech products to a variety of technology platforms. Many on-device as well as on-cloud speech applications have been developed, which deliver strong ASR (automated speech recognition) performance. Deep learning has also enabled digital personal assistants that have become an important resource for everyday use. Speech recognition-based products are expected to work well in not just controlled environments but also in acoustic scenarios including noise, far-field conditions, non-native speech, child voices, whisper, natural conversation, and side-speech etc. These expectations are difficult to meet with a single deep learning model. While some speech models have been combined, the combinations generally result in the need for significantly more computing resources to execute.

SUMMARY

A computer implemented method classifies an input corresponding to multiple different kinds of input. The method includes obtaining a set of features from the input, providing the set of features to multiple different models to generate state predictions, generating a set of state-dependent predicted weights, and combining the state predictions from the multiple models, based on the state-dependent predicted weights for classification of the set of features.

DETAILED DESCRIPTION

Figure 1:
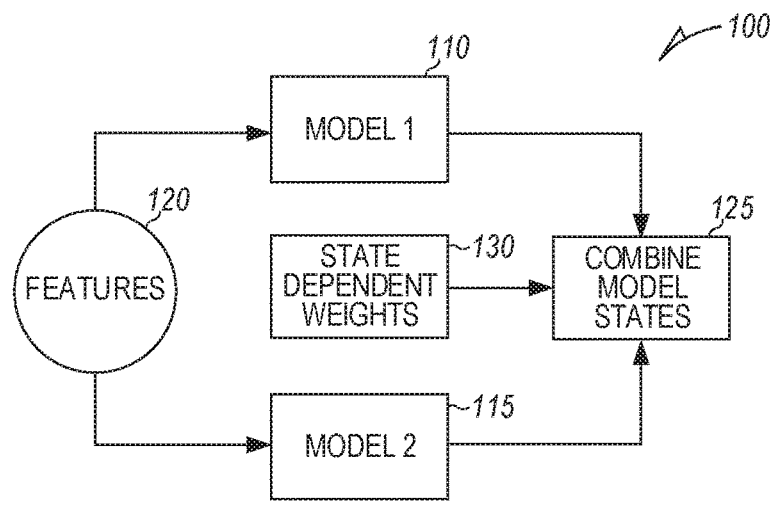
FIG. 1 is block diagram of a system that combines two acoustic models according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

The goal of a speech application is to produce the highest possible accuracy given reasonable constraints in computing power and latency. Over the past years, speech researchers have developed a variety of algorithms and architectures to learn speech models, as well as, speech features robust to acoustic scenarios. Recently, deep long-short term memory (LSTM) approaches have been used to improve the performance of deep neural network (DNN) speech models. LSTM models explicitly control the memory of the network in terms of input and forget gate modules to provide a control over the information flow in the network and alleviate a gradient vanishing problem associated with deep networks. These and other newer advances in deep learning have provided many improvements in end-to-end speech processing systems.

Besides speech features and model structures, speech recognition (SR) systems also leverage techniques in model or speaker adaptation that personalize models for a specific scenario or speaker. These adaptation techniques provide significant value on top of speaker-independent (SI) models. In addition, acoustic model combination (AMOC) has also been used to improve various aspects of speech recognition performance.

The present inventive subject matter uses static and dynamic combination of acoustic model states to provide an improvement to many types and applications of ASR. A state-dependent set of weights are learned in a data-driven framework that aligns with ASR training criterion. These weights are can be static, i.e. fixed for the models, or dynamic, where the weights are obtained from a prediction model.

The accuracy of speech recognition is improved through combination of different acoustic models. State predictions from two different models are combined, element by element, with a different weight for each element. The weights may be determined statically or dynamically. This allows a lower confidence level for an element to receive less weight in the overall confidence level. This leads to better accuracy in speech recognition.

FIG. 1 is block diagram of a system 100 that combines two acoustic models, model 1 at 110 and model 2 at 115. Note that many more acoustic models may be combined in further examples. Model 110 may be an acoustic model that has been trained to work very well for a broad range of acoustic scenarios. Model 110 may be referred to as a generic acoustic model. Model 115 may be a dedicated model that is specifically trained for a far-field speaker scenario, or another scenario. Features 120, such as speech or image features are provided to the two models. The features may include different kinds of input, such as normal speech, far field speech, or other kinds of speech. In an image recognition example, the feature may include input corresponding to daylight images or images taken at night, or in the rain. Note that the generic model may be trained on a training data set that includes many if not all the different kinds of speech, while dedicated models may be trained on one or a few of the different kinds of speech.

The two models 110 and 115 are combined at 125 such that the single combined model shows strong gains for each of the scenarios over the previous best results in that scenario. In some embodiments, more than two models, such as N models may be combined. The combination is performed based on state dependent weights 130, which have been derived based on the different kinds of input expected. The weights for each state are independently derived, such as by a deep learning model. In speech recognition, the states may comprise senones, speech segments, or other sounds, while in image recognition, the states may comprise sets of pixels representing lines or other combinations of pixels. The ability to combine models at the state level can be applied to many other practical applications by identifying different conditions under which input is collected and training different models for such different conditions.

In further examples a diverse number of dedicated models for different speech and noise scenarios may be used. The ability to combine such dedicated models can be helpful for server applications, where robust ASR performance may be obtained despite highly varied acoustic application environments, audio processing pipelines, and speaker bases, etc. With a single combined model, the diverse acoustic scenarios and applications may be served without the need for additional modifications.

State combination of the acoustic models is an effective technique in the broad scope of model combination. LSTM-RNN models consist of a few layers of LSTM cells along with a top layer that includes a function to receive an input vector of K real numbers and normalize the input function into a probability distribution consisting of K probabilities. The top layer may be referred to as a SoftMax layer. Context-dependent tied tri-phones, a class of sounds in context, constitute the acoustic states in one example. The output of the combined model provides a predication distribution over the states for a given frame of speech features.

Combining the models at the state level is equivalent to combining the predicted distributions for respective models, and has been applied before. However, most previous work uses a fixed state-independent weight for model combination, where the weight is tuned on the task of interest. In contrast, the present inventive subject matter utilizes state dependent weights by analyzing the combination weights, ingesting new capabilities in the state combination framework. In particular, a data-driven framework learns the state combination weights, and ASR criterion is used to learn the model weights to be best aligned with ASR performance. State-dependent capabilities are utilized in the combination weights. Static as well as dynamic prediction frameworks are also used for the weights.

In a further example, the combination weights in the framework of the ASR itself may be used. A data-driven framework is used for learning the combination weights for both static state prediction (SSP) and dynamic state prediction (DSP) approaches.

Figure 2:
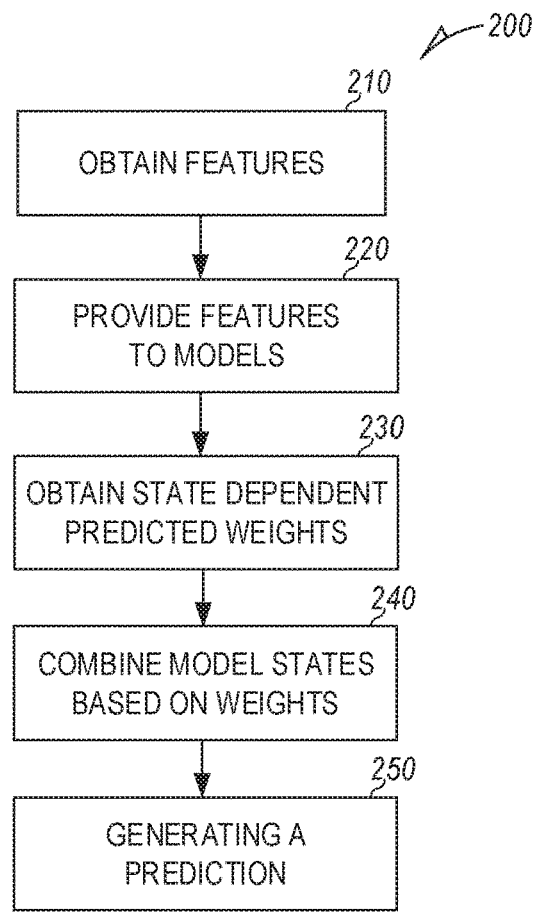
FIG. 2 is a flowchart illustrating a computer implemented method of combining acoustic models according to an example embodiment.

FIG. 2 is a flowchart illustrating a computer implemented method 200 for combining model states utilizing state dependent combination weights. Multiple different kinds of related input is classified by method 200. The input is related in that it is of the same general type, such as speech, or images, or other types of input, however, the kind of speech or images are different as previously described. Multiple operations are described at a general level, with algorithm details described further below.

Method 200 starts by obtaining a set of features from an input at operation 210. The input in one example is speech, such as the phrase: "set an alarm." The features may be obtained in a known manner and comprise digital representations of speech. At operation 220, the features are provided to multiple speech recognition models that have been trained on different kinds of speech and/or each of the multiple models may have different structures or modeling technologies. The different kinds of speech may include two or more of speech in a noisy environment, native speech, non-native speech, child speech, whispered speech, natural conversation speech, and distant speech, as well as other kinds of speech, which may vary for different applications. The models may be deep learning LSTM acoustic models in one embodiment. Some types of models may be used in further embodiments, such as Bidirectional LSTM, generic Recurrent Neural Networks (RNN), Convolutional Neural Networks (CNN) or other Feed-forward acoustic models.

Two different models with different structure or modeling technologies may be trained on the same kind of speech, or on different kinds of speech. The models generate state predictions based on the features in accordance with their specific training.

At operation 230, state dependent predicted weights are obtained. The predicted weights may be generated by a trained deep learning network, which is trained on a training set of state labeled features. Weights may be time dependent static weights or may be provided by a prediction cell based on the current features.

The state predictions from the models are combined based on the state dependent predicted weights for classification of the set of features at operation 240. An utterance from a user desiring to set an alarm may take the form of "set an alarm." A prediction of the input—"set an alarm"—is then provided at operation 250. Note that the prediction may take any form, such as the actual spoken words, or even a code corresponding to the spoken words, such as a command for input into an application for setting an alarm.

Referring again to system 100, the extracted features 120 are provided to the different models 110 and 115 that have been trained for generating states based on different kinds of input. State dependent weights 130 may utilize a small prediction model, referred to as a combination cell that dynamically evaluates the model combination weight $\alpha_t[k]$ for time instant t and acoustic state k. A time-independent $\alpha[k]$ may also be trained for static state prediction such that a prediction model need not be used.

The SSP approach uses time-independent combination weights $\alpha[k]$. For SSP, the combined model states are represented in Equation 1:

$$S[k] = \alpha[k] \cdot S_1[k] + (1-\alpha[k]) \cdot S_2[k] \qquad \text{EQUATION (1)}$$

In Equation 1, the state combination weights are $\alpha[k]$ with k indicating an acoustic state. Equation 1 is state dependent with dimension as the number of states in the acoustic model, and $S_1$ and $S_2$ are the state predictions from the two acoustic models. If N acoustic models are to be combined, the weight for the states of each of the separate models will add up to 1.

All weights $\alpha[k]$ are between 0 and 1, and may be initialized to a fixed value, such as i. Standard ASR training criterion may be used to train state-dependent combination weights. In a further example, $\alpha[k]$ may be restrained to be identical for all states but is sub-optimal compared state-dependent $\alpha[k]$. The choice of the value of initialization parameter i likely depends on the application scenario, and the nature of the models. In one application, the initialization weight, i=0.5 is used and works well as an initialized value for the weights. Equation 1, referred to as, combination, may be applied to the Softmax $S_1$ and $S_2$ state predictions by models 110 and 115 respectively.

The state-independent combination weights, i.e. with identical $\alpha[k]$ for all states, is a special case of the state-dependent weights. Beginning from the general case of state-dependent model combination in Equation 1, a special case exists where for a particular speech frame, only one of the states, say k, is dominant for both the models, and rest of states, i.e., $S_1[j]$ and $S_2[j]$ are either 0 or significantly small for $j \neq k$. In that restricted special case, Equation 1 is equivalent to:

$$S = \alpha[k] \odot S_1 + (1-\alpha[k]) \odot S_2, S_1[j] \approx 0, S_2[j] \approx 0 \text{ for } j \neq k \qquad \text{EQUATION 2}$$

Where $\odot$ indicates element-wise product. The predicted weights $\alpha$ is identically $\alpha[k]$ for all states k in above state-independent combination approach.

In comparison to the baseline combination with identical $\alpha$ for all acoustic states, SSP offers additional advantages. SSP training aligns with the ASR training objectives to learn state-dependent combination weights. This allows SSP to best leverage the state classification boundaries from individual models. The training criterion converges to a state-dependent $\alpha$. The predicted $\alpha$ for states like "sil", "noise" strongly favor the generic model.

The generic model, model 1 at 110 may be trained using a large corpus including mobile and close-talking data. Thus, the generic model learns the classification for silence and noise. In comparison, the dedicated model training in one acoustic based example may predominantly consist of far-field and noisy data, where the classification boundaries for silence and noise are fuzzy. Overall, SSP learns a way to best leverage the classification boundaries from the individual models.

In one embodiment, dynamic state prediction (DSP) is used to generate dynamic state dependent combination weights. In SSP, SR training criterion is leveraged to train state-dependent combination weights. Audio from different acoustic conditions exhibit different characteristics, therefore, static combination weights are likely sub-optimal.

Figure 3:
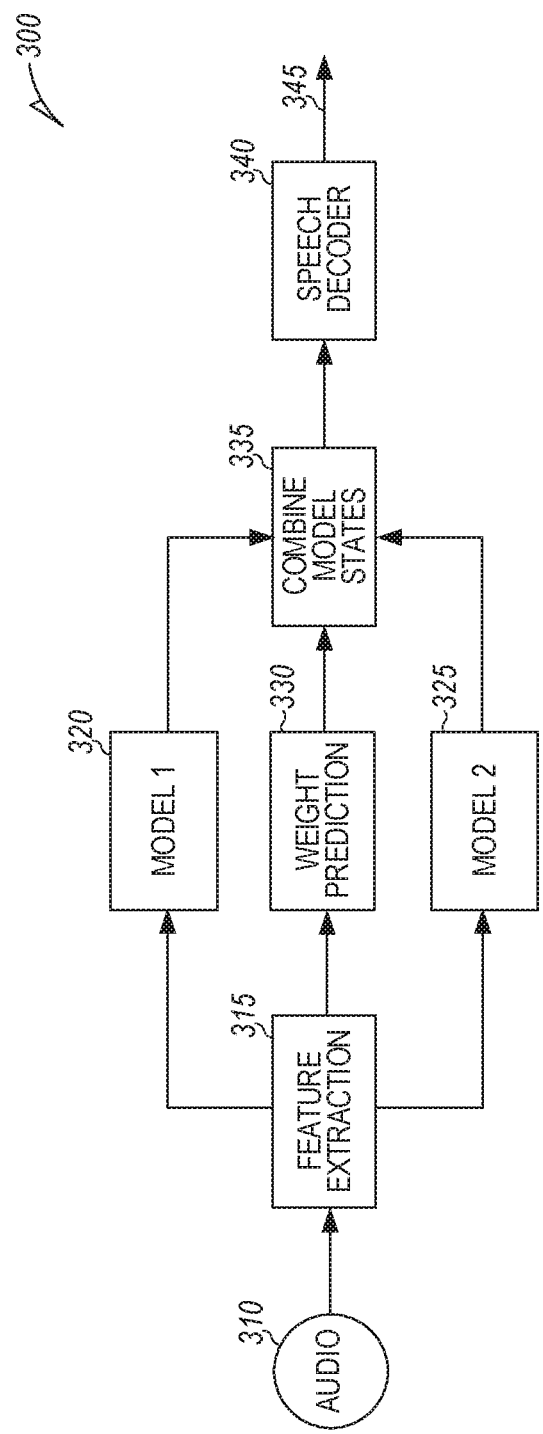
FIG. 3 is a block diagram of a framework for dynamically determining combination weights for combining acoustic models according to an example embodiment.

FIG. 3 is a block diagram of a framework 300 for dynamic acoustic model combination using SSP. Framework 300 is described in terms of a speech recognition application, but is also applicable to other applications, such as image recognition. Audio 310 is provided to a feature extraction mechanism 315 to extract features from speech. The speech may be received from a microphone, or received in digital form from a recording.

The extracted features from mechanism 315 is provided to two different models 320 and 325 that have been trained for generating states based on different kinds of input. The features are also provided to a weight prediction model 330 that operates to predict weights for combining the states as indicated at a combining mechanism 335. The combined states are used to provide predictions using a small prediction model based on the combination of states. The predictions are provided to a speech decoder 340, which outputs the predicted speech at 345.

Scenario-dependent combination may be leveraged by dynamically predicting time and state-dependent combination weights $\alpha_t[k]$ in:

$$S_t[k] = \alpha_t[k] \cdot S_{1,t}[k] + (1-\alpha_t[k]) \cdot S_{2,t}[k] \qquad \text{EQUATION 3}$$

A prediction model is used to predict $\alpha_t[k]$ at time instant t and acoustic state k. A variety of prediction models may be used in the DSP framework. In one embodiment, the acoustic model consists of LSTM cells, making it logical to use a one-layer LSTM cell to model and predict $\alpha_t[k]$. The prediction model aligns well with the core ASR models; SR features and ASR training criterion may be reused to predict $\alpha_t[k]$.

Figure 4:
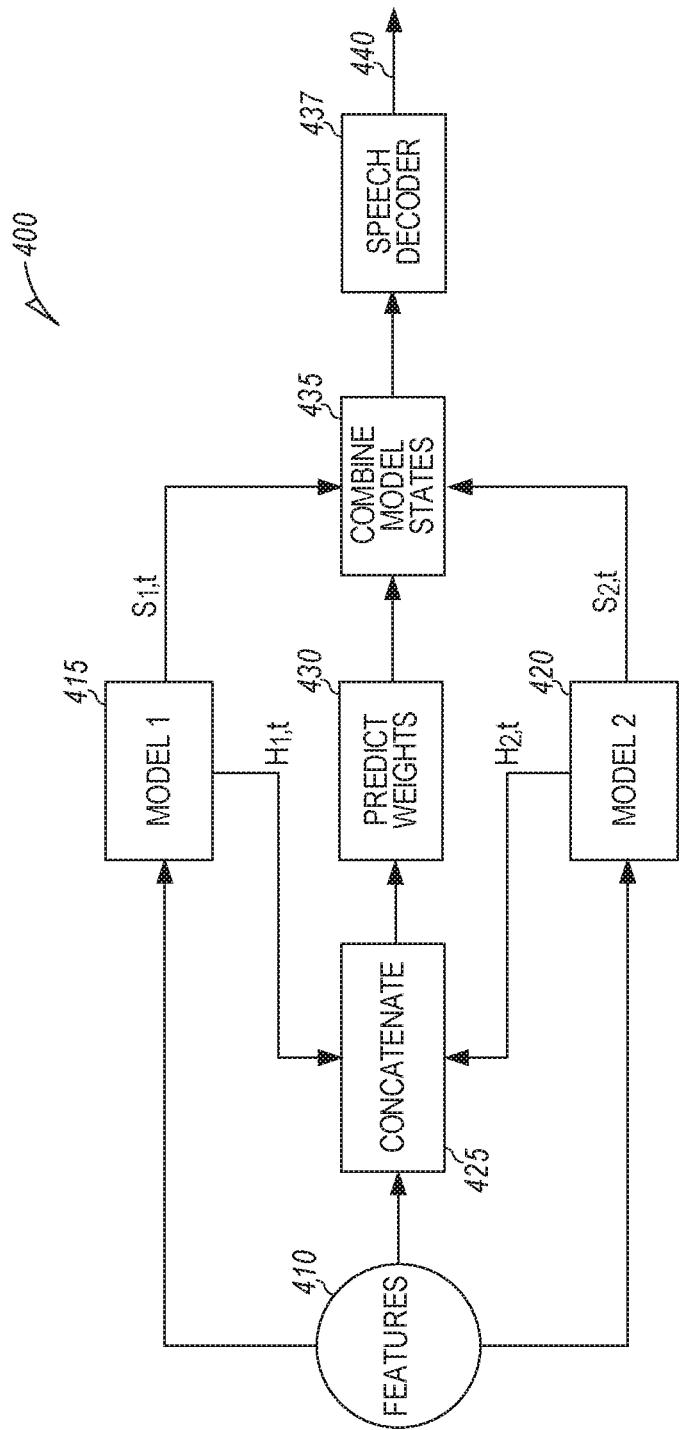
FIG. 4 is a block diagram of an alternative framework for dynamically determining combination weights for combining acoustic models according to an example embodiment.

FIG. 4 illustrates a framework 400 that is an extension of the DSP approach. Features 410 are provided to model 1 415 and model 2 420. Hidden layer outputs H1t and H2t respectively from the models are provided to a concatenation function 425. The concatenated hidden layer outputs are provided to the weight prediction model 430, with the weights provided to a combiner 435 to produce the prediction that is provided to speech decoder 437, which outputs the predicted speech at 440. Framework 400 is based on an understanding that in a deep network, the initial layers normalize the features and make it robust across speakers and acoustic environments. Whereas, the upper layers gradually learn decision boundaries. Framework 400 allows incorporation of some information from the individual ASR models.

Figure 5:
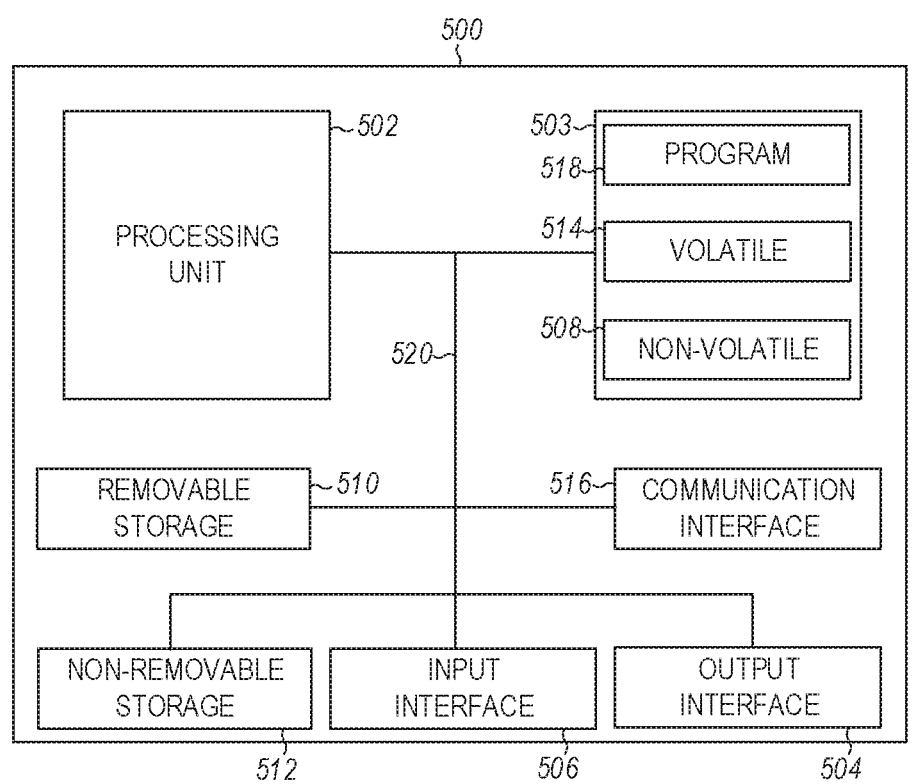
FIG. 5 is a block schematic diagram of a computer system to implement one or more example embodiments.

FIG. 5 is a block schematic diagram of a computer system 500 to implement one or more methods of combining states of multiple models for providing predictions corresponding to different types of input according to example embodiments. All components need not be used in various embodiments.

One example computing device in the form of a computer 500 may include a processing unit 502, memory 503, removable storage 510, and non-removable storage 512. Although the example computing device is illustrated and described as computer 500, the computing device may be in different forms in different embodiments. For example, the computing device may instead be a smartphone, a tablet, smartwatch, smart storage device (SSD), or other computing device including the same or similar elements as illustrated and described with regard to FIG. 5. Devices, such as smartphones, tablets, and smartwatches, are generally collectively referred to as mobile devices or user equipment.

Although the various data storage elements are illustrated as part of the computer 500, the storage may also or alternatively include cloud-based storage accessible via a network, such as the Internet or server based storage. Note also that an SSD may include a processor on which the parser may be run, allowing transfer of parsed, filtered data through I/O channels between the SSD and main memory.

Memory 503 may include volatile memory 514 and non-volatile memory 508. Computer 500 may include—or have access to a computing environment that includes—a variety of computer-readable media, such as volatile memory 514 and non-volatile memory 508, removable storage 510 and non-removable storage 512. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM). Digital Versatile Disks (DVD) or other optical disk storage, magnetic cassettes, magnetic tape, magnetic disk storage or other magnetic storage devices, or any other medium capable of storing computer-readable instructions.

Computer 500 may include or have access to a computing environment that includes input interface 506, output interface 504, and a communication interface 516. Output interface 504 may include a display device, such as a touchscreen, that also may serve as an input device. The input interface 506 may include one or more of a touchscreen, touchpad, mouse, keyboard, camera one or more device-specific buttons, one or more sensors integrated within or coupled via wired or wireless data connections to the computer 500, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Bluetooth, or other networks. According to one embodiment, the various components of computer 500 are connected with a system bus 520.

Computer-readable instructions stored on a computer-readable medium are executable by the processing unit 502 of the computer 500, such as a program 518. The program 518 in some embodiments comprises software to implement one or more methods described herein. A hard drive, CD-ROM, and RAM are some examples of articles including a non-transitory computer-readable medium such as a storage device. The terms computer-readable medium and storage device do not include carrier waves to the extent carrier waves are deemed too transitory. Storage can also include networked storage, such as a storage area network (SAN). Computer program 518 along with the workspace manager 522 may be used to cause processing unit 502 to perform one or more methods or algorithms described herein.

EXAMPLES

1. A computer implemented method classifies input corresponding to multiple different kinds of input. The method includes obtaining a set of features from the input, providing the set of features to multiple different models to generate state predictions, generating a set of state-dependent predicted weights, and combining the state predictions from the multiple models, based on the state-dependent predicted weights for classification of the set of features.

2. The method of example 1 wherein the multiple different models are trained for input corresponding to a different kind of input.

3. The method of any of examples 1-2 wherein the multiple models have different structures or utilize different modeling technologies.

4. The method of any of examples 1-3, wherein the input comprises speech and the set of features comprise digital representations of speech.

5. The method of example 4 wherein the multiple models comprise speech recognition models independently trained on the same or different kinds of speech.

6. The method of any of examples 4-5 wherein the different kinds of speech include two or more of speech in a noisy environment, native speech, non-native speech, child speech, whispered speech, natural conversation speech, and distant speech.

7. The method of any of examples 1-6 wherein the multiple models comprise deep long-term short memory (LSTM) acoustic models.

8. The method of any of examples 1-7 wherein generating the set of state dependent predicted weights is performed by a deep learning network trained on a training set of state labeled features.

9. The method of any of examples 1-8 wherein the set of predicted weights are time dependent static weights.

10. The method of any of examples 1-9 wherein the set of predicted weights are dynamic weights provided by a prediction cell.

11. The method of example 10 wherein the set of predicted dynamic weights are provided by one of the models comprising Bidirectional long-term short memory (LSTM), generic Recurrent Neural Networks (RNN), or Convolutive Neural Networks (CNN).

12. The method of any of examples 1-11 and further comprising using the combined state predictions to classify the input as one or more spoken words.

13. A machine-readable storage device has instructions for execution by a processor of a machine to cause the processor to perform operations to perform a method of classifying different kinds of input. The operations include obtaining a set of features from the input, providing the set of features to multiple different models to generate state predictions, generating a set of state dependent predicted weights, and combining the state predictions from the multiple models, based on the state dependent predicted weights for classification of the set of features.

14. The device of example 13 wherein the multiple different models are trained for input corresponding to a different kind of input, wherein the multiple models have different structures or utilize different modeling technologies, or wherein the different models comprise a combination thereof.

15. The device of any of examples 13-14 wherein the input comprises speech, the set of features comprise digital representations of speech, and wherein the multiple models comprise speech recognition models independently trained on different kinds of speech.

16. The device of example 15 wherein the different kinds of speech include two or more of speech in a noisy environment, native speech, non-native speech, child speech, whispered speech, natural conversation speech, and distant speech.

17. The device of any of examples 13-16 wherein the set of predicted weights are dynamic weights provided by a prediction cell.

18. A device includes a processor and a memory device coupled to the processor and having a program stored thereon for execution by the processor to perform operations. The operations include obtaining a set of features from the input, providing the set of features to multiple different models to generate state predictions, generating a set of state dependent predicted weights, and combining the state predictions from the multiple models, based on the state dependent predicted weights for classification of the set of features.

19. The device of example 18 wherein the input comprises speech, and the set of features comprise digital representations of speech, wherein the multiple different models comprise speech recognition models independently trained on different kinds of speech, or each of the multiple models trained for input corresponding to a different kind of input, or combinations thereof, and wherein the different kinds of speech include two or more of speech in a noisy environment, native speech, non-native speech, child speech, whispered speech, natural conversation speech, and distant speech.

20. The device of any of examples 18-19 wherein generating the set of state dependent predicted weights is performed by a trained deep learning network trained on a training set of state labeled features.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A computer-implemented method for classification of input corresponding to multiple different kinds of input, the method comprising:
    obtaining a set of features from the input, wherein the input comprises speech and the set of features comprise digital representations of speech;
    providing the set of features to multiple different acoustic models that have been trained on different kinds of input, or have different structures or modeling technologies, to generate state predictions, wherein the acoustic models comprise hidden layer outputs;
    generating a set of state-dependent predicted weights from the hidden layer outputs;
    combining the state predictions from the multiple acoustic models, based on the state-dependent predicted weights, for classification of the set of features;
    and providing the combined state predictions to a speech decoder to classify the input as one or more spoken words;
    wherein the set of state-dependent predicted weights are dynamic weights;
    and wherein the hidden layer outputs are concatenated hidden layer outputs that are generated by providing the hidden layer outputs from the different acoustic models to a concatenation function.

2. The method of claim 1, wherein the multiple acoustic models are speech recognition models independently trained on the same or different kinds of speech, and wherein the different kinds of speech include two or more of speech in a noisy environment, native speech, non-native speech, child speech, whispered speech, natural conversation speech and distant speech.

3. The method of claim 1 wherein the multiple models comprise deep long-term short memory (LSTM) acoustic models.

4. The method of claim 1 wherein generating the set of state dependent predicted weights is performed by a deep learning network trained on a training set of state labeled features.

5. The method of claim 1 wherein the set of predicted weights are time dependent static weights.

6. The method of claim 1, wherein the set of predicted dynamic weights are provided by one of the acoustic models comprising Bidirectional long-term short memory (LSTM), generic Recurrent Neural Networks (RNN), or Convolution Neural Networks (CNN).

7. A machine-readable storage device having instructions for execution by a processor of a machine to cause the processor to perform operations to perform a method of classifying different kinds of input, the operations comprising:
    obtaining a set of features from the input, wherein the input comprises speech and the set of features comprise digital representations of speech;
    providing the set of features to multiple different acoustic models that have been trained on different kinds of input, or have different structures or modeling technologies, to generate state predictions, wherein the acoustic models comprise hidden layer outputs;
    generating a set of state-dependent predicted weights from the hidden layer outputs;
    combining the state predictions from the multiple acoustic models, based on the state-dependent predicted weights for classification of the set of features;
    and providing the combined state predictions to a speech decoder to classify the input as one or more spoken words;
    wherein the set of state-dependent predicted weights are dynamic weights;
    and wherein the hidden layer outputs are concatenated hidden layer outputs that are generated by providing the hidden layer outputs from the different acoustic models to a concatenation function.

8. The device of claim 7, wherein the multiple acoustic models are speech recognition models independently trained on the same or different kinds of speech, and wherein the different kinds of speech include two or more of speech in a noisy environment, native speech, non-native speech, child speech, whispered speech, natural conversation speech; and distant speech.

9. A device comprising:
    a processor; and a memory device coupled to the processor and having a program stored thereon for execution by the processor to perform operations comprising:

obtaining a set of features from the input, wherein the input comprises speech and the set of features comprise digital representations of speech;

providing the set of features to multiple different acoustic models that have been trained on different kinds of input, or have different structures or modeling technologies, to generate state predictions, wherein the acoustic models comprise hidden layer outputs;

generating a set of state-dependent predicted weights from the hidden layer outputs;

combining the state predictions from the multiple acoustic models, based on the state-dependent predicted weights for classification of the set of features;

and providing the combined state predictions to a speech decoder to classify the input as one or more spoken words;

wherein the set of state-dependent predicted weight are dynamic weights;

wherein the hidden layer outputs ae concatenated hidden layer outputs that are generated by providing the hidden layer outputs from the different acoustic models to a concatenation function.

10. The device of claim 9, wherein the multiple acoustic models are speech recognition models independently trained on the same or different kinds of speech, and wherein the different kinds of speech include two or more of speech in a noisy environment, native speech, non-native speech, child speech, whispered speech, natural conversation speech and distant speech.

11. The device of claim 9 wherein generating the set of state dependent predicted weights is performed by a trained deep learning network trained on a training set of state labeled features.

* * * * *